(12) United States Patent
Wong et al.

(10) Patent No.: US 11,829,547 B1
(45) Date of Patent: Nov. 28, 2023

(54) TOUCH KEY DESIGN METHOD BASED ON TOUCH SCREEN

(71) Applicant: Guangzhou Yuda Electronics Co., Ltd., Guangzhou (CN)

(72) Inventors: Ming Fai Christopher Wong, Hong Kong (HK); Yanping Zhang, Ganzhou (CN)

(73) Assignee: GUANGZHOU YUDA ELECTRONICS CO., LTD., Guangzhou (CN)

(*) Notice: Subject to any disclaimer, the term of this patent is extended or adjusted under 35 U.S.C. 154(b) by 0 days.

(21) Appl. No.: 17/897,804

(22) Filed: Aug. 29, 2022

(30) Foreign Application Priority Data

Jul. 22, 2022 (CN) .......................... 202210868959.1

(51) Int. Cl.
  *G06F 3/041* (2006.01)
  *G06F 3/04886* (2022.01)
  *G06F 1/16* (2006.01)
  *G06F 9/451* (2018.01)

(52) U.S. Cl.
  CPC .......... *G06F 3/0416* (2013.01); *G06F 1/1643* (2013.01); *G06F 3/04886* (2013.01); *G06F 9/451* (2018.02)

(58) Field of Classification Search
  CPC .. G06F 3/0416; G06F 3/04886; G06F 1/1643; G06F 9/451
  See application file for complete search history.

(56) References Cited

U.S. PATENT DOCUMENTS

| | | | | |
|---|---|---|---|---|
| 2010/0268426 | A1* | 10/2010 | Pathak | G06F 3/04886 345/173 |
| 2013/0106748 | A1* | 5/2013 | Hosaka | G06F 9/451 345/173 |
| 2015/0109151 | A1* | 4/2015 | Page | G06F 3/04886 341/22 |
| 2017/0040009 | A1* | 2/2017 | Daily | G10H 1/0066 |
| 2020/0031656 | A1* | 1/2020 | Rudick | G06F 3/013 |
| 2021/0011604 | A1* | 1/2021 | Yoganandan | G06F 3/044 |
| 2021/0200368 | A1* | 7/2021 | Wang | G06F 3/0412 |
| 2021/0405825 | A1* | 12/2021 | Narayanan | G06N 20/00 |

* cited by examiner

*Primary Examiner* — Ryan A Lubit
(74) *Attorney, Agent, or Firm* — Chun-Ming Shih; LANWAY IPR SERVICES

(57) ABSTRACT

The present disclosure discloses a touch key design method based on a touch screen, wherein a plastic part is placed on a touch screen, so that the touch screen is equally divided into a plurality of (such as 4×4) areas with the same size. In this way, the touch screen can be regarded as a plurality of (such as 4×4) matrix touch keys. When one of the touch keys is touched by hand, an MCU (a main control unit of a recording software controller) determines which touch key is pressed through the X and Y coordinate values returned by the touch screen, and then controls the corresponding functions. On the touch screen, not only the function name of the recording software corresponding to each touch key is displayed, but also the state of pressing or releasing the touch key and the state about whether the corresponding function on the recording software is activated or non-activated can be displayed in real time. In addition, users are allowed to change the position and the function name of each touch key in the touch screen randomly according to their own usage habits and preferences.

4 Claims, 2 Drawing Sheets

TOUCH KEY DESIGN METHOD BASED ON TOUCH SCREEN

TECHNICAL FIELD

The present disclosure relates to the technical field of recording software, in particular to a touch key design method based on a touch screen.

BACKGROUND

The existing recording software controller uses physical keys such as silicone keys. The hand feeling and sensitivity of the keys are not very good, and the screen printing of the key function cannot be changed. However, there are dozens of types of commonly used recording software, so that it is necessary to customize a PVC functional film for each recording software. When using the recording software, the corresponding PVC functional film is placed, so that the key function on the controller corresponds to the function on the recording software. This is very troublesome. The user needs to change the functional film when switching the recording software, and the user cannot customize and adjust the function of each key.

SUMMARY

In view of this, in order to solve the above problems in the prior art, the present disclosure proposes a touch key design method based on a touch screen, in which users can customize the position and the function of each touch key as required and display the position and the function on the touch screen.

The present disclosure solves the above problems by the following technical means.

The present disclosure provides a touch key design method based on a touch screen, which comprises the steps of:
  dividing the touch screen into a plurality of areas according to a preset size to form a touch key matrix;
  reading a preset function mapping table, wherein the information in the function mapping table comprises a function name and a function code of each touch key and the corresponding relationship therebetween;
  when a touch signal is detected, judging the corresponding touch key according to the coordinate of generating the touch signal;
  sending the function code of the corresponding touch key to recording software, so that the recording software executes the corresponding operation instructions;
  when receiving the state change information sent by the recording software, updating the display content on a touch key matrix in real time based on the state change information.

Reading the preset function mapping table specifically comprises the steps of:
  acquiring a configured function mapping table through an upper computer, wherein the function mapping table comprises at least two arrays, which are used to store the function names and the corresponding function codes of each touch key arranged in sequence, respectively;
  according to the information in the function mapping table, displaying, by a main control unit, the function names of each touch key stored in the function name array in each touch key area of the touch screen in sequence.

Further, sending the function code of the corresponding touch key to the recording software specifically comprises the steps of:
  determining the corresponding function name according to the coordinate of the touch signal, and inquiring the corresponding function code in the function mapping table according to the function name;
  sending the inquired function code to the recording software.

Further, when a touch signal is detected, judging the corresponding touch key according to the coordinate of generating the touch signal specifically comprises the steps of:
  when the level of a corresponding pin on a touch chip built in the touch screen changes, judging that the touch signal is detected, wherein the touch chip stores the XY coordinate value of a touch point in an internal register at this time;
  after the main control unit detects that the level of the corresponding pin on the touch chip changes, judging that the type of the touch signal is a pressing signal or a releasing signal according to the level change;
  reading, by the main control unit, the XY coordinate value of the touch point stored in the internal register of the touch chip, and judging the touch key corresponding to the touch point according to the XY coordinate value.

Further, judging that the type of the touch signal is a pressing signal or a releasing signal according to the level change specifically comprises the steps of:
  if the level changes from a high level to a low level, taking the type of the touch signal as a pressing signal; and if the level changes from a low level to a high level, taking the type of touch signal as a releasing signal.

Further, the method according to the present disclosure further comprises the steps of:
  after judging that the type of the touch signal is a pressing signal or a releasing signal according to the level change, driving, by a main control chip, the touch screen to display the state of pressing or releasing the touch key in real time.

Further, when receiving the state change information sent by the recording software, updating the display content on a touch key matrix in real time based on the state change information specifically comprises the steps of:
  when the state of a certain function of the recording software changes, sending state change information to the main control unit; wherein the state change information comprises a function code corresponding to a function;
  when the main control unit receives the state change information, determining the changed touch key and the type of state change and updating the display content in the relevant touch key area in real time.

Further, determining the changed touch key and the type of state change and updating the display content in the relevant touch key area in real time specifically comprises the steps of:
  when the format of the received state change information is a NOTE OFF code, the type of state change: changes from the activated state to the non-activated state; when the format of the received state change information is a NOTE ON code, the type of state change: changes from the non-activated state to the activated state;
  comparing, by the main control unit, the received state change information with the data in a function code array one by one, and when the data match, recording the position of the data in the array, so as to determine the position of the changed touch key;

based on the position of the touch key and the type of state change, updating the display content in the relevant touch key area in real time.

Further, updating the display content on a touch key matrix in real time based on the state change information specifically comprises the steps of:

if the function of a touch key is currently in the non-activated state, displaying only the function name in the touch key area;

if the function of a touch key is currently in the activated state, displaying the function name and the background color in the touch key area.

Further, sending the function code of the corresponding touch key to recording software, so that the recording software executes the corresponding operation instructions, specifically comprises the steps of:

sending the function code of the corresponding touch key to the recording software through a USB MIDI protocol, so as to control the functions of the recording software.

Compared with the prior art, the beneficial effects of the present disclosure at least include the following content.

According to the present disclosure, a plastic part is placed on a touch screen, so that the touch screen is equally divided into a plurality of (such as 4×4) areas with the same size. In this way, the touch screen can be regarded as a plurality of (such as 4×4) matrix touch keys. When one of the touch keys is touched by hand, an MCU (a main control unit of a recording software controller) determines which touch key is pressed through the X and Y coordinate values returned by the touch screen, and then controls the corresponding functions. On the touch screen, not only the function name of the recording software corresponding to each touch key is displayed, but also the state of pressing or releasing the touch key and the state about whether the corresponding function on the recording software is activated or non-activated can be displayed in real time. In addition, users are allowed to change the position and the function name of each touch key in the touch screen randomly according to their own usage habits and preferences.

BRIEF DESCRIPTION OF THE DRAWINGS

In order to explain the technical scheme in the embodiments of the present disclosure more clearly, the drawings needed in the description of the embodiments will be briefly introduced hereinafter. Obviously, the drawings in the following description are only part of the embodiments of the present disclosure. For those skilled in the art, other drawings can be obtained according to these drawings without creative labor.

DETAILED DESCRIPTION OF THE EMBODIMENTS

In order to make the above objects, features and advantages of the present disclosure more obvious and understandable, the technical scheme of the present disclosure will be explained in detail with reference to the drawings and specific embodiments hereinafter. It should be pointed out that the described embodiments are only part of the embodiments of the present disclosure, rather than all of the embodiments. Based on the embodiments of the present disclosure, all other embodiments obtained by those skilled in the art without creative labor fall within the scope of protection of the present disclosure.

Figure 1:
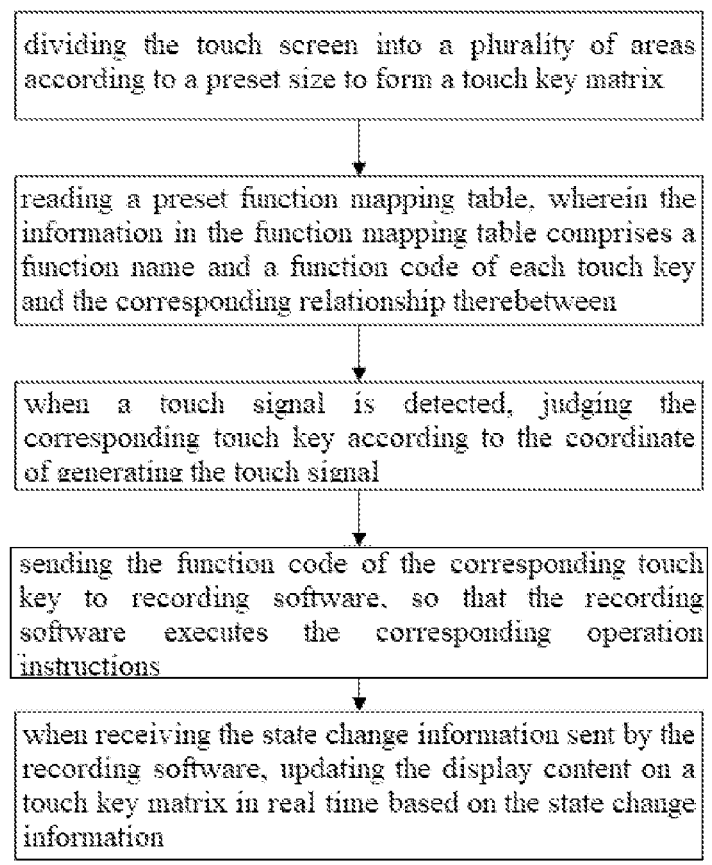
FIG. 1 is a flowchart of a touch key design method based on a touch screen according to the present disclosure.

As shown in FIG. 1, the present disclosure provides a touch key design method based on a touch screen 1 (see FIG. 2), which is used to replace the traditional physical keys (such as silica gel keys, etc.) on a recording software controller, comprising the steps of:

dividing the touch screen into a plurality of areas according to a preset size to form a touch key matrix;

reading a preset function mapping table, wherein the information in the function mapping table comprises a function name and a function code of each touch key and the corresponding relationship therebetween;

when a touch signal is detected, judging the corresponding touch key according to the coordinate of generating the touch signal;

sending the function code of the corresponding touch key to recording software, so that the recording software executes the corresponding operation instructions;

when receiving the state change information sent by the recording software, updating the display content on a touch key matrix in real time based on the state change information.

According to the present disclosure, a plastic part is placed on a touch screen, so that the touch screen is equally divided into a plurality of (such as 4×4) areas with the same size. In this way, the touch screen can be regarded as a plurality of (such as 4×4) matrix touch keys. When one of the touch keys is touched by hand, an MCU (a main control unit of a recording software controller) determines which touch key is pressed through the X and Y coordinate values returned by the touch screen, and then controls the corresponding functions. On the touch screen, not only the function name of the recording software corresponding to each touch key is displayed, but also the state of pressing or releasing the touch key and the state about whether the corresponding function on the recording software is activated or non-activated can be displayed in real time. In addition, users are allowed to change the position and the function name of each touch key in the touch screen randomly according to their own usage habits and preferences.

In order to make the purpose, the technical scheme and the advantages of the present disclosure clearer, the embodiment of the present disclosure will be described in further detail in conjunction with specific application scenarios hereinafter.

S1, a touch key matrix is provided on a touch screen.

Figure 2:
FIG. 2 is a schematic diagram of a touch key matrix according to an embodiment of the present disclosure.

The touch screen is divided into a plurality of areas, thereby setting the touch screen into a touch key matrix. In this embodiment, a plastic part is placed on the touch screen, and the touch screen is equally divided into a plurality of areas with the same size, so that the touch screen is set into a touch key matrix, as shown in FIG. 2.

S2, it is detected whether the touch screen is touched in real time.

After the touch chip built in the touch screen acquires the touch signal, the level of the corresponding pin (INT pin in this embodiment) on the touch chip will change, and the XY coordinate value of the touch point will be stored in the internal register at the same time. The pins of the touch screen are connected with the main control unit (referred to as MCU hereinafter) of the recording software controller. The MCU can capture the level change of the INT pin of the touch chip and send a command to read the value in the internal register of the touch chip.

S3, it is judged whether the touch key presses a signal or the touch key releases a signal.

After the MCU captures the level change of the INT pin on the touch chip, it is judged whether the touch key presses a signal or the touch key releases a signal. Thereafter, the main control unit of the recording software controller can also drive the touch screen to display the state of pressing or releasing the touch key in real time.

The level of the INT pin on the touch chip changes from a high level to a low level, which is the pressing signal of the touch key. The level changes from a low level to a high level, which is the releasing signal of the touch key.

S4, it is judged which touch key is pressed or released.

The MCU sends a command to read the XY coordinate values of the touch point stored in the internal register of the touch chip, and then judges which touch key is pressed or released by the read coordinate value.

The plastic part on the touch screen divides the touch screen into different touch key areas, so that it is possible to determine which touch key area is touched by comparing the read XY coordinate values.

S5, the functions of the recording software are controlled.

After judging which touch key is pressed or released, the MCU sends the function codes (MIDI codes in this embodiment) corresponding to the touch key function to the recording software through a USB MIDI protocol, so as to control the functions on the recording software.

It should be noted that the MIDI codes sent by pressing and releasing the touch key are different, so that the MCU needs to judge whether the touch key is pressed or released.

S6, the display content in the relevant touch key area is updated in real time.

When the state of some functions on the recording software changes from the activated state to the non-activated state or from the non-activated state to the activated state, the recording software will send the MIDI codes corresponding to the functions to the recording software controller. The main control unit of the recording software controller updates the display content in the relevant touch key area in real time after judging which touch keys have changed their function states and how the function states have changed.

S61, it is detected whether the recording software has data returned in real time.

When the state of some functions (such as the circulation function) on the recording software changes, the MIDI code corresponding to the function will be sent to the recording software controller, and the NOTE OFF code will be sent when the state changes from the activated state to the non-activated state (for example, the NOTE OFF code corresponding to the circulation function is 0x09 0x90 0x56 0x00); and the NOTE ON code will be sent when the state changes from the non-activated state to the activated state (for example, the NOTE ON code corresponding to the circulation function is 0x09 0x90 0x56 0x7f).

S62, the data is analyzed, and it is determined which touch key has changed its function state.

The MCU stores the function names and the corresponding MIDI codes of each touch key in two different arrays (assuming array A and array B) in sequence. After detecting the data returned by the recording software, the MCU compares the received data with the data in the MIDI code array one by one. When the data match, the position of the data in the array can be recorded to determine which touch key has changed its function state.

S63, it is judged how the function state changes.

By analyzing the data format of the received data, MCU determines whether it is a NOTE ON code or a NOTE OFF code, so as to determine how the function state changes (from the activated state to the non-activated state or from the non-activated state to the activated state).

S64, the display content of the relevant touch key is updated in real time.

After the MCU judges which touch keys have changed their function states and how the function states have changed, the display content in the relevant touch key area is updated in real time (if the function is currently in the non-activated state, only the key function name is displayed in the touch key area; and if the function is currently in the activated state, the key function name and the background color are displayed in the touch key area.

Compared with the traditional recording software controller using physical keys, the present disclosure allows users to change (need to use recording software) the position and the function name of each touch key in the touch screen randomly according to their own usage habits and preferences, such as exchanging the positions of the touch keys "Input" and "Output" in FIG. 2 or changing the function name of the touch key "Input" to "Input 1". That is, the touch key design method based on a touch screen further comprises the following steps.

S7, the position and the function name of the touch key are changed.

Users can change the position and the function name of each touch key in the touch screen randomly according to their own usage habits and preferences.

S71, the upper computer software of the recording software controller is used to configure data.

In the function name list of the upper computer software of the recording software controller, each function corresponds to a different MIDI function code. Users can map different functions to different touch keys and change the function names displayed in the touch keys according to their own usage habits and preferences. After the configuration, similarly, the upper computer software of the recording software controller stores the configured function names and corresponding MIDI codes of each touch key in two different arrays (assuming array A1 and array B1) in sequence.

S72, the data is sent to the recording software controller.

The upper computer software of the recording software controller can click "Send Data" to send the data to the recording software controller after connecting the USB device of the recording software controller.

S73, the recording software controller updates and saves the data.

After receiving the data sent by the upper computer software of the recording software controller, the main control unit of the recording software controller replaces the data in array A and array B with the received data in array A1 and array B1 and saves the received data.

S74, the function name of the touch key is updated and displayed.

The MCU displays the received function name of each touch key stored in array A1 in each touch key area of the touch screen in sequence. Similarly, when a key is touched, its MIDI code will be replaced with the data in array B1 corresponding to array A1.

According to the present disclosure, a plastic part is placed on a touch screen, so that the touch screen is equally divided into a plurality of (such as 4×4) areas with the same size. In this way, the touch screen can be regarded as a plurality of (such as 4×4) matrix touch keys. When one of the touch keys is touched by hand, an MCU (a main control unit of a recording software controller) determines which touch key is pressed through the X and Y coordinate values returned by the touch screen, and then controls the corresponding functions. On the touch screen, not only the function name of the recording software corresponding to each touch key is displayed, but also the state of pressing or releasing the touch key and the state about whether the corresponding function on the recording software is activated or non-activated can be displayed in real time. In addition, users are allowed to change the position and the function name of each touch key in the touch screen randomly according to their own usage habits and preferences.

The above embodiments only show several embodiments of the present disclosure, which are specifically described in detail, but should not be construed as limiting the scope of protection of the present disclosure. It should be pointed out that several modifications and improvements can be made for those skilled in the art without departing from the concept of the present disclosure, all of which belong to the scope of protection of the present disclosure. Therefore, the scope of protection of the present disclosure should be subject to the appended claims.

What is claimed is:

1. A touch key design method based on a touch screen, comprising the steps of:

dividing the touch screen into a plurality of areas according to a preset size to form a touch key matrix;

reading a preset function mapping table, wherein the information in the preset function mapping table comprises a function name and a function code of each touch key and the corresponding relationship therebetween, and wherein the function name and the function code of each touch key are configured by users according to their own usage habits and preferences;

when a level of a corresponding pin of the touch screen changes, a touch signal is detected, judging the corresponding touch key according to the coordinate of generating the touch signal, wherein the level of the pin determines if the touch key is in a pressing status or a releasing status;

wherein when the level of the corresponding pin on a touch chip built in the touch screen changes, judging that the touch signal is detected, wherein the touch chip stores a XY coordinate value of a touch point in an internal register at this time;

after a main control unit detects that the level of the corresponding pin on the touch chip changes, judging that a type of the touch signal is a pressing signal or a releasing signal according to a level change;

reading, by the main control unit, the XY coordinate value of the touch point stored in the internal register of the touch chip, and judging the touch key corresponding to the touch point according to the XY coordinate value;

sending the function code of the corresponding touch key to a recording software, so that the recording software executes the corresponding operation instructions;

when receiving a state change information sent by the recording software, updating the display content on the touch key matrix in real time based on the state change information.

2. The touch key design method according to claim 1, wherein reading the preset function mapping table specifically comprises the steps of:

acquiring a configured function mapping table, wherein the configured function mapping table are used to store the function names and the corresponding function codes of each touch key arranged in sequence, respectively;

according to the information in the configured function mapping table, displaying the function names of each touch key stored in the configured function mapping table in each touch key area of the touch screen in sequence.

3. The touch key design method according to claim 2, wherein sending the function code of the corresponding touch key to the recording software specifically comprises the steps of:

determining the corresponding function name according to the coordinate of the touch signal, and inquiring the corresponding function code in the function mapping table according to the function name;

sending the inquired function code to the recording software.

4. The touch key design method according to claim 1, wherein sending the function code of the corresponding touch key to recording software, so that the recording software executes the corresponding operation instructions, specifically comprises the steps of:

sending the function code of the corresponding touch key to the recording software through a USB MIDI protocol, so as to control the functions of the recording software.

* * * * *